(12) United States Patent
Jung et al.

(10) Patent No.: US 7,937,745 B2
(45) Date of Patent: May 3, 2011

(54) VOICE-CAPABLE SYSTEM AND METHOD FOR USER-DIRECTED NETWORK INTERACTION MONITORING FOR AUTHENTICATION AND CONFIDENTIALITY DESIGNATION

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund, I, LLC, Bellevue, WA (US)

( * ) Notice: Subject to any disclaimer, the term of this patent is extended or adjusted under 35 U.S.C. 154(b) by 1576 days.

(21) Appl. No.: 11/263,575

(22) Filed: Oct. 31, 2005

(65) Prior Publication Data

US 2007/0101402 A1    May 3, 2007

(51) Int. Cl.
*H04L 9/32* (2006.01)
*G06F 15/16* (2006.01)
*G06F 17/30* (2006.01)

(52) U.S. Cl. .......................................................... 726/3
(58) Field of Classification Search ........................ 726/3
See application file for complete search history.

(56) References Cited

U.S. PATENT DOCUMENTS

| | | | |
|---|---|---|---|
| 2005/0071168 A1* | 3/2005 | Juang et al. | 704/273 |
| 2007/0016429 A1* | 1/2007 | Bournas et al. | 705/1 |
| 2007/0033089 A1* | 2/2007 | Dharmarajan et al. | 705/9 |

* cited by examiner

*Primary Examiner* — Kambiz Zand
*Assistant Examiner* — Aubrey H Wyszynski
(74) *Attorney, Agent, or Firm* — Margaret M. Anderson

(57) ABSTRACT

A system and method for use with a voice-capable system, includes but is not limited to a method including receiving a request from a user computationally networked to the voice-capable system, the request to designate a network interaction as a monitored network interaction using the security interface, and receiving one or more user-defined designations during the monitored network interaction, the one or more user-defined designations to designate one or more data as requiring the voice-capable system to perform one or more operations with respect to the one or more data.

39 Claims, 7 Drawing Sheets

---

Receiving a request from a user computationally networked to the voice-capable system, the request to designate a network interaction as a monitored network interaction using the security interface  410

Receiving an identifier from the user, the identifier identifying the user and enabling the security interface to log the monitored network interaction  4102

Receiving one or more user-defined designations during the monitored network interaction, the one or more user-defined designations to designate one or more data as requiring the voice-capable system to perform one or more operations with respect to the one or more data  420

| Receiving the one or more user-defined designations as one or more designations of facts uniquely associated with the user to develop one or more questions for authenticating the user in an authentication session  4202 | Receiving one or more designations of computationally networked sources of data concerning the user, the designations identifying one or more user-preferred sources of data for authentication by the voice-capable system  4204 | Retrieving one or more logged data via the security interface, the one or more logged data including facts uniquely associated with the user and identified by the user  42062 |
|---|---|---|
| | | Retrieving the one or more logged data via an application programming interface including a data structure configured to hold the logged data, the application programming interface operable on an application running the security interface  420622 |
| | | Retrieving the logged data from a data store, the data store coupled to receive the logged data from a utility of the security interface, the utility including one or more of a drag and drop utility, a designation utility, and/or a VIVO-enabled application  420624 |

Storing the one or more logged data in a database  42064

| Designating the logged data as facts uniquely associated by the user  420642 | Assigning a date to the logged data  420644 |
|---|---|

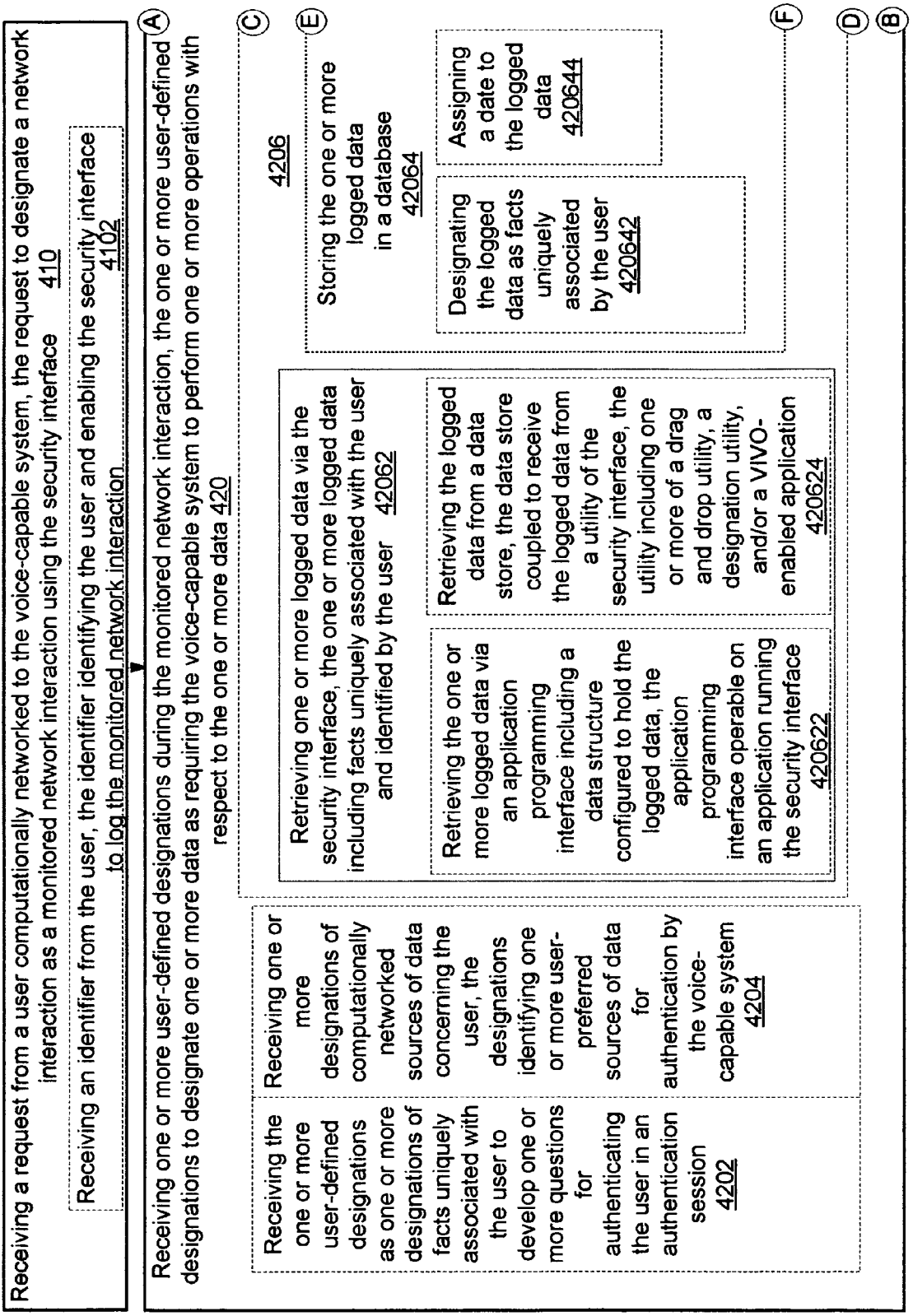

FIGURE 4C

Performing the one or more operations with respect to the one or more data, the one or more operations including scanning one or more of data identified via the user-defined designations for confidential material, content checking, facts unique to the user for use in an authentication with the user for security purposes, and/or data identified via the user-defined designations for purposes of cross-correlating the one or more data with predetermined data
430

VOICE-CAPABLE SYSTEM AND METHOD FOR USER-DIRECTED NETWORK INTERACTION MONITORING FOR AUTHENTICATION AND CONFIDENTIALITY DESIGNATION

TECHNICAL FIELD

The present application relates generally to security systems.

SUMMARY

In one aspect, a method for use with a voice-capable system, the voice capable system including a security interface for authenticating a user to the voice-capable system includes but is not limited to receiving a request from a user computationally networked to the voice-capable system, the request to designate a network interaction as a monitored network interaction using the security interface and receiving one or more user-defined designations during the monitored network interaction, the one or more user-defined designations to designate one or more data as requiring the voice-capable system to perform one or more operations with respect to the one or more data. In addition to the foregoing, other method aspects are described in the claims, drawings, and text forming a part of the present application.

In another aspect, a computing system includes but is not limited to a secure user interface application and an operating system executing on the computing system, including an application programming interface (API) to facilitate communication between the secure user interface application and a voice-capable system wherein the API includes: a data structure to pass logged data identified by a user in a user initiated monitored network interaction; and an operational data structure to enable a user to store the logged data identified by the user designating data via a utility associated with the secure user interface application. In addition to the foregoing, other computing system aspects are described in the claims, drawing and text forming a part of the present application.

In another aspect, a computer program product includes but is not limited to a signal bearing medium bearing at least one of one or more instructions for receiving a request from a user computationally networked to the voice-capable system, the request to designate a network interaction as a monitored network interaction using the security interface and one or more instructions for receiving one or more user-defined designations during the monitored network interaction, the one or more user-defined designations to designate one or more data as requiring the voice-capable system to perform one or more operations with respect to the one or more data. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to affect the herein-referenced method aspects depending upon the design choices of the system designer. In addition to the foregoing, other system aspects are described in the claims, drawings, and text forming a part of the present application.

In one aspect, a voice-capable system includes but is not limited to a processor, an audio input and/or output circuitry coupled to the processor, a memory coupled to the processor, and an access module for receiving a request from a user computationally networked to the voice-capable system, the request to designate a network interaction as a monitored network interaction using the security interface coupled to the memory, a network interaction monitoring module for receiving one or more user-defined designations during the monitored network interaction, the one or more user-defined designations to designate one or more data as requiring the voice-capable system to perform one or more operations with respect to the one or more data coupled to the memory. In addition to the foregoing, other voice-capable system aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which:

FIGS. 4A, 4B and 4C illustrate a flow diagram of a method in accordance with an embodiment of the subject matter of the present application.

DETAILED DESCRIPTION OF THE DRAWINGS

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

According to William Crossman, Founder/Director of CompSpeak 2050 Institute for the Study of Talking Computers and Oral Cultures, VIVOs, (e.g., voice-in/voice-out computers that may operate using visual displays) may make written language obsolete. VIVOs potentially can perform the functions of written language without requiring people to learn to read and write and, therefore, enable illiterate people, using VIVOs, to access the stored information.

Opening the doors for potentially billions of people to electronically-stored data presents a host of issues related to security and/or authentication. More particularly, according to Crossman, billions of illiterate people will be able to access data previously available only to the computer literate. The increase in the number of people with access to the Internet will increase the need for security systems that address the enhanced security risk. Moreover, VIVO technology will increase the number of security systems reliant on voice commands and subject users to security risks present with voice related systems.

To combat the security risk inherent in a VIVO system, embodiments herein present authentication and/or security solutions practical for voice-related security.

Figure 1:
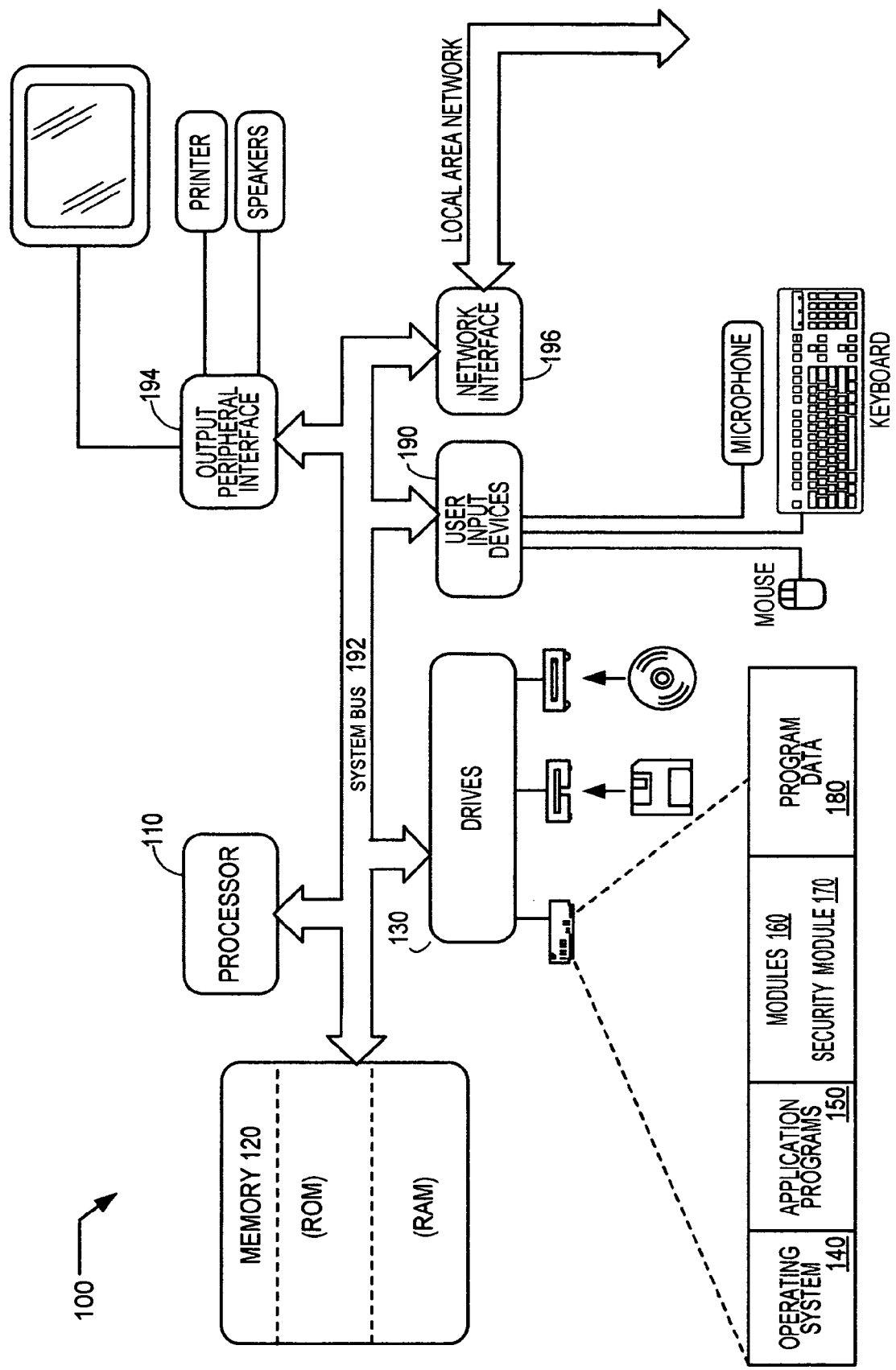
FIG. 1 is a block diagram of an exemplary computer architecture that supports the claimed subject matter of the present application.

With reference to FIG. 1, depicted is an exemplary computing system for implementing embodiments. FIG. 1 includes a computer 100, which could be a VIVO-capable computer, including a processor 110, memory 120 and one or more drives 130. The drives 130 and their associated computer storage media, provide storage of computer readable instructions, data structures, program modules and other data for the computer 100. Drives 130 can include an operating system 140, application programs 150, program modules 160, such as security module 170 and program data 180. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like. In one or more embodiments, user input devices 190 are VIVO-enabling devices, enabling a user to provide voice-activated responses and/or questions.

These and other input devices can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, which may be connected through an output peripheral interface 194 or the like. More particularly, output devices can include VIVO enabling devices capable of providing voice output in response to voice input.

Computer 100 may operate in a networked environment using logical connections to one or more remote computers, such as a remote computer. The remote computer may be a personal computer, a server, a router, a network PC, a peer device or other common network node, and can include many or all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or adapter. When used in a WAN networking environment, computer 100 typically includes a modem or other means for establishing communications over the WAN to environments such as the Internet. It will be appreciated that other means of establishing a communications link between the computers may be used.

According to one embodiment, computer 100 is connected in a networking environment such that the processor 110 and/or security module 170 determine whether incoming data follows a secure protocol. The incoming data can be from a VIVO communication device or from another data source. The secure protocol can be code stored in memory 120. For example, processor 110 can determine whether an incoming call is from a VIVO, determine that a secure protocol is necessary and apply an appropriate authentication.

Figure 2:
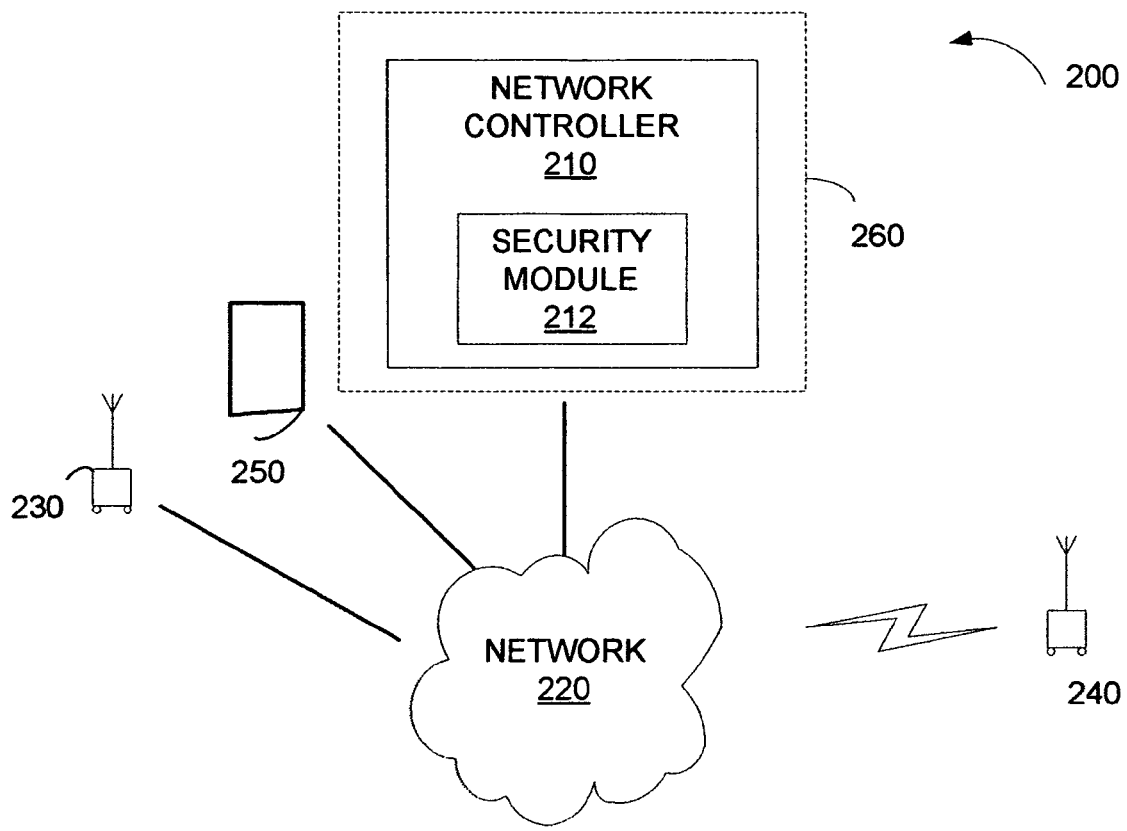
FIG. 2 is a block diagram of a network environment that supports the claimed subject matter of the present application.

Referring now to FIG. 2, illustrated is an exemplary block diagram of a system 200 capable of being operable with VIVO computer systems and interacting with a VIVO-type computer system. System 200 is shown including network controller 210, a network 220, and one or more communication devices 230, 240, and 250. Communication devices 230, 240, and 250 may include telephones, wireless telephones, cellular telephones, personal digital assistants, computer terminals or any other devices that are capable of sending and receiving data. As described below, network controller 210 and security module 212 can optionally be disposed within a communication device 260. For example, the communication device could be a cellular or mobile telephone with capabilities to authenticate using a VIVO system.

Network controller 210 is connected to network 220. Network controller 210 may be located at a base station, a service center, or any other location on network 220. Network 220 may include any type of network that is capable of sending and receiving communication signals, including VIVO-type signals. For example, network 220 may include a data network, such as the Internet, an intranet, a local area network (LAN), a wide area network (WAN), a cable network, and other like communication systems. Network 220 may also include a telecommunications network, such as a local telephone network, long distance telephone network, cellular telephone network, satellite communications network, cable television network and other like communications systems that interact with computer systems. Network 220 may include more than one network and may include a plurality of different types of networks. Thus, network 220 may include a plurality of data networks, a plurality of telecommunications networks, and a combination of data and telecommunications networks and other like communication systems.

In operation, one of the communication devices 230, 240, 250 or 260, may attempt a communication with a receiving communication device. The communication can be routed through network 220 and network controller 210 to the receiving communication device. For example, a call originator communication device 230 may attempt a call to a call recipient communication device 240. In an embodiment, controller 210 is a VIVO-enabled controller such that an audible format may be a speech format. According to an embodiment, controller 210 can include a security module 212 that can poll the caller and a call recipient communication device 240 during call setup to pose authentication questions to secure a connection. For example, a call could be to a bank or other recipient with sensitive data requiring security.

Controller 210 can alter the format of the call by performing speech-to-text conversion on the call when controller 210 determines the format of the call requires a format change. Controller 210 can additionally alter the format of the call by performing text-to-speech conversion on the call when controller 210 determines the format of the call requires a format change. Controller 210 can then send the call in an appropriate format to the call recipient 240. In one embodiment, controller 210 is a VIVO-enabled controller that alters speech to text or speech to computer code in accordance with the requirements of a VIVO.

Figure 3:
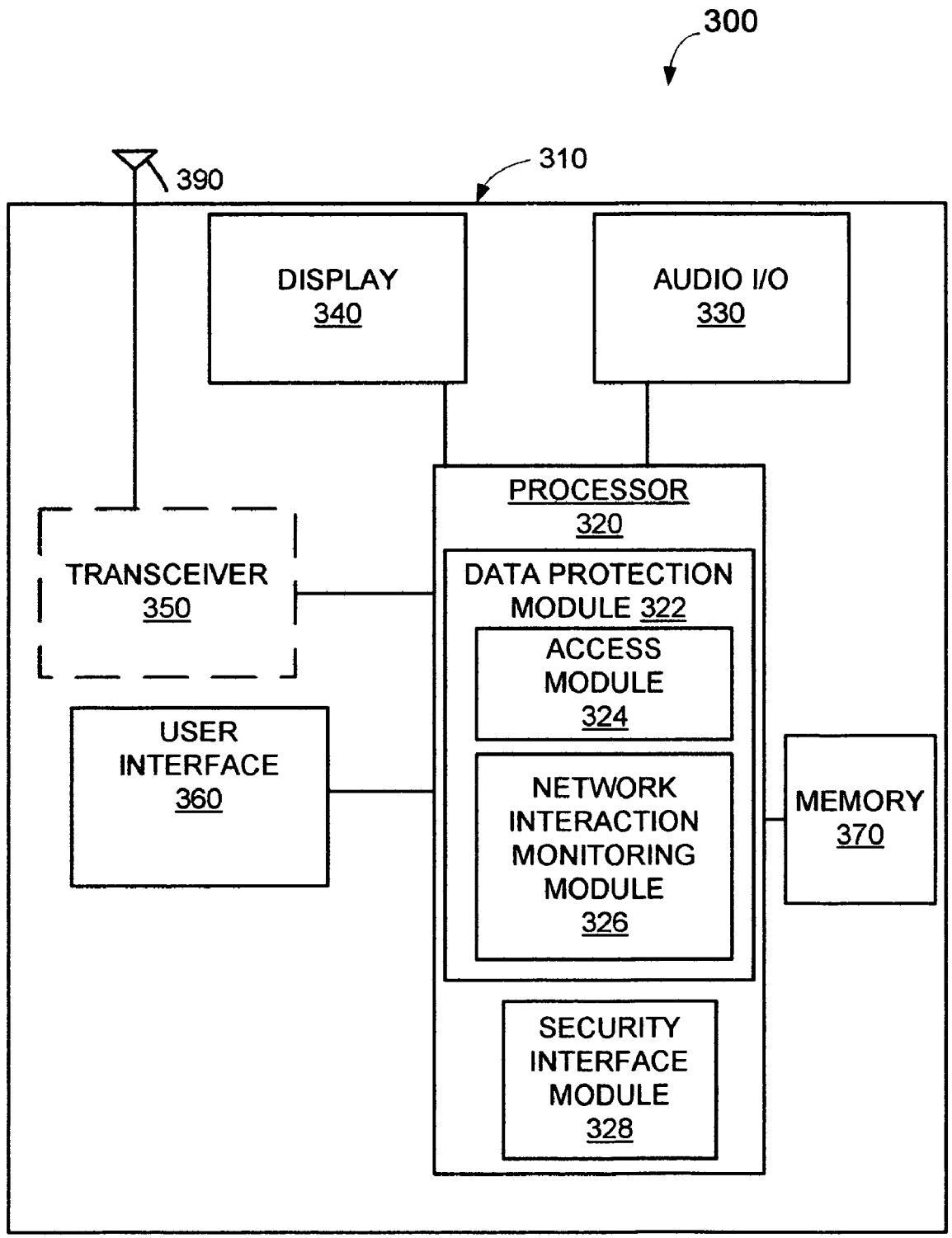
FIG. 3 is a block diagram of a communication device appropriate for embodiments of the subject matter of the present application.

FIG. 3 is an exemplary block diagram of a communication device 300, such as communication device 230, 240, 250 or 260 according to an embodiment, (e.g. FIG. 2). Communication device 300 can include a housing 310, a processor 320, audio input and output circuitry 330 coupled to processor 320, a display 340 coupled to processor 320, a user interface 360 coupled to processor 320 and a memory 370 coupled to processor 320. According to an embodiment, processor 320 includes data protection module 322. Data protection module 322 may be hardware coupled to the processor 320. Alternatively, data protection 322 could be located within processor 320, or located in software located in memory 370 and executed by processor 320, or any other type of module. Memory 370 can include a random access memory, a read only memory, an optical memory, a subscriber identity module memory, or any other memory that can be coupled to a communication device. Display 340 can be a liquid crystal display (LCD), a light emitting diode (LED) display, a plasma display, or any other means for displaying information. Audio input and output circuitry 330 can include a microphone, a speaker, a transducer, or any other audio input and output circuitry. User interface 360 can include a keypad, buttons, a touch pad, a joystick, an additional display, or any other device useful for providing an interface between a user and an electronic device.

Processor 320 can be configured to control the functions of communication device 300. Communication device 300 can send and receive signals across network 220 using a transceiver 350 coupled to antenna 390. Alternatively, communication device 300 can be a device relying on twisted pair technology and not utilize transceiver 350.

According to an embodiment, a user can use either the user interface 360 for input and output of information to and from communication device 300 or use input and output using the audio input and output circuitry 330. Data received by communication device 300 can be displayed on display 340 and/or provided audibly through audio input and output circuitry 330. Communication device 300 can operate as a VIVO when operated in a fully audible format. For example, VIVO applications can be stored on memory 370 and processed by processor 320.

In one embodiment, either or both computer 100 and communication device 300 operate as VIVOs that are capable of implementing a secure protocol for incoming and/or outgoing audible data and/or speech. According to one embodiment, the processor 320 and/or data protection module 322 can determine whether an incoming call follows a secure protocol. The secure protocol can be code stored in memory 370. For example, processor 320 can determine an incoming call is from a VIVO, determine that a secure protocol is necessary and apply an appropriate authentication. Conversely, processor 320 and/or data protection module 322 can determine that an outgoing call should follow a secure protocol and implement the secure protocol.

The secure protocol, in one embodiment, implements an audible question and answer authentication for one or both of incoming and outgoing data when an auditory format is detected. For example, if computer 100 or communication device 300 is used to communicate with a bank, the bank could implement a secure protocol by operating a computer 100 with a security module or a communication device 300 with a security module. Likewise, the bank could operate via a secure network such as a network described in FIG. 2, and implement a secure protocol via network controller 210 implementing a security protocol via data protection module 322.

In one embodiment, the security module is configured to operate with a processor (e.g., in either computer 100, communication device 300, or in a network controller 210) to implement embodiments. According to an embodiment, data protection module 322 is configured with modules for implementing embodiments disclosed herein. More particularly, data protection module 322 can be configured with access module 324 which can be configured for accessing by the voice-capable system of one or more entities computationally networked to the voice-capable system. The entities computationally networked to the voice-capable system can be entities with different security requirements and required authentications. For example, an entity computationally networked to the voice-capable system can be within a same computational network, such as a local area network (LAN), or the like. Conversely, an entity computationally networked can be networked through an Internet connection but require firewall access or other security measures to connect.

Processor 320 includes both data protection module 322 and security interface module 328. According to an embodiment, security interface module 328 is configured to enable modules to interface with computationally networked entities and collect user-directed network interactions.

More particularly, the security module could include an access module 324 configured for receiving a request from a user computationally networked to the voice-capable system, the request to designate a network interaction as a monitored network interaction using the security interface 328. The request could be received from a user using a cell phone that is VIVO enabled or from another source. For example, a cellular or mobile phone can include or be included within a computing device with VIVO-enabling software or the like.

Data protection module 322 is illustrated further including a network interaction-monitoring module 326 for receiving one or more user-defined designations during the monitored network interaction, the one or more user-defined designations to designate one or more data as requiring the voice-capable system to perform one or more operations with respect to the one or more data. Thus, for example, after a user accesses the VIVO system, the VIVO system can receive user-defined designations that identify data during a monitored network interaction. The data identified can include monitored interactions between a user and an institution, web site, or other network capable entity from which the user can identify data for purposes of further operations to be performed with respect to the identified data. In one embodiment, data protection module is located on the user's network. For example, the data protection module can be located on the user's cellular telephone, computer or the like such that all the data identified is saved on a data store secured by the user. In other embodiments, data protection module 322 is located on a VIVO system outside the user's control, such as a VIVO enabled entity that can store the data identified by the user.

Figure 4B:
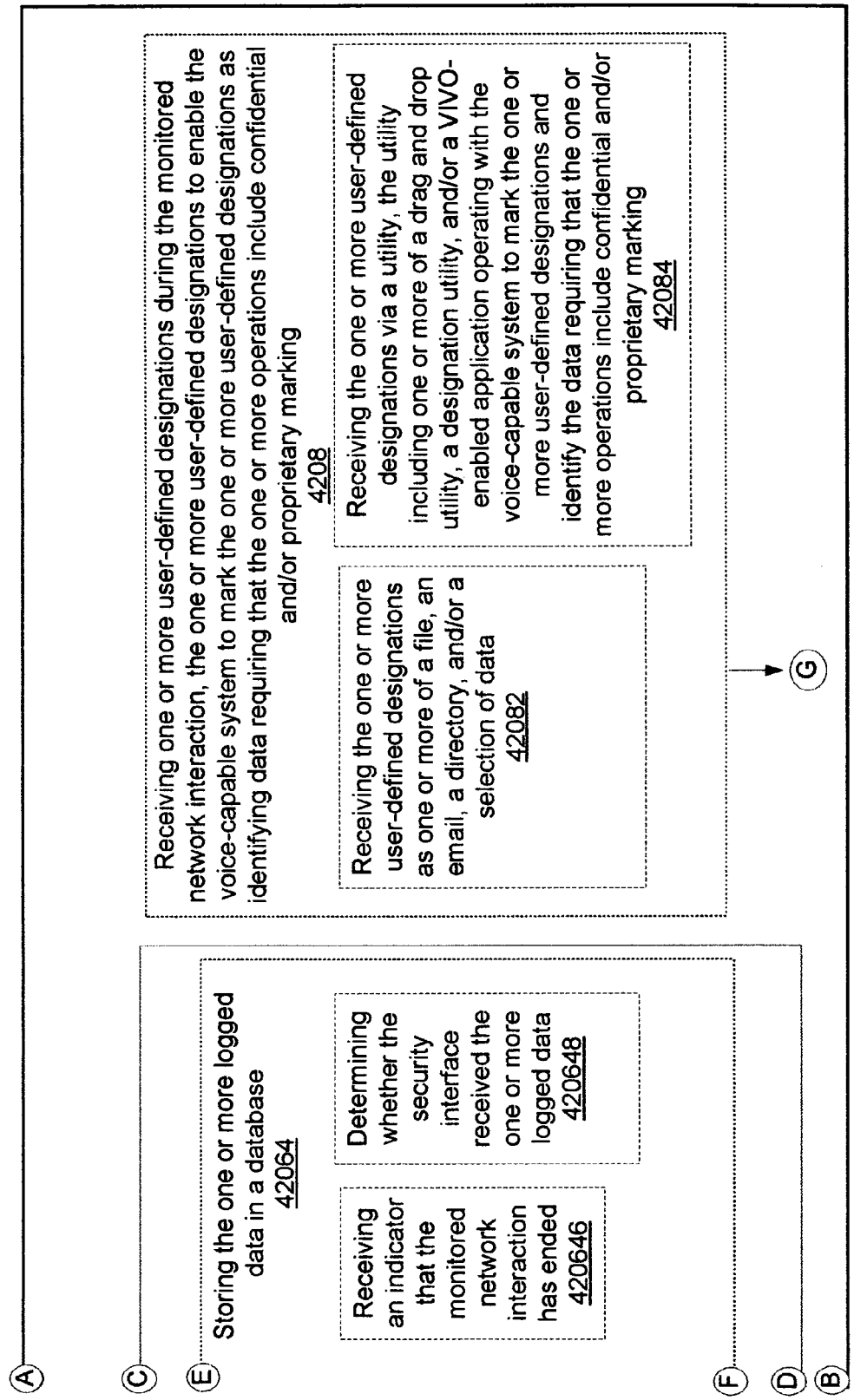

Referring now to FIGS. 4A, 4B and 4C, an exemplary flow diagram illustrates the operation of the processor 320 and/or data protection module 322 and/or network controller 210 according to an embodiment. One of skill in the art with the benefit of the present disclosure will appreciate that act(s) can be taken by data protection module 322, network controller 210, processor 110, and/or security module 170. The acts are generally referred to as being taken by a security processor.

FIGS. 4A, 4B and 4C provide methods for use with a voice-capable system. In one embodiment the voice-capable system requires authentication. The authentication could be via a telephone to a security processor from a VIVO or the like. For example, a bank can receive a request to authenticate a customer. A security processor can determine that an authentication session is required. For example, the determination can be a determination by a bank that a user wishes to log into the bank. The determination can include a determination that a user is using a telephone to log into the bank via audible-only methods of communication. For example, a bank can operate via a network capable of accepting auditory communications from a user and have a computer, such as computer 100, or network controller 210, respond with auditory communications back to the user. After an authentication, if required, the methods herein enable a user to identify data for later operations to be performed. For example, some embodiments herein allow a user to be computationally networked to both a security processor that can receive user-defined designations, and the user to be computationally networked to an entity with which a user can have a monitored network interaction. In other embodiments, a user can be computationally networked with an entity with which the user has a monitored network interaction and locally operate a security processor that can receive user-defined designations.

Block 410 provides for receiving a request from a user computationally networked to the voice-capable system, the request to designate a network interaction as a monitored network interaction using the security interface.

Depicted within block 410 is optional block 4102, which provides for receiving an identifier from the user, the identifier identifying the user and enabling the security interface to log the monitored network interaction. More particularly, the voice-capable system can enable a user to log a monitored network interaction by linking a user with an identifier. The identifier can provide a link to monitored data for later operations to be performed.

Block 420 provides for receiving one or more user-defined designations during the monitored network interaction, the one or more user-defined designations to designate one or more data as requiring the voice-capable system to perform one or more operations with respect to the one or more data. The received user-defined designation can include highlighted or the like interactions that could be used in an authentication or for use in determining whether the data designated by the user requires more attention.

Depicted within block 420 is optional block 4202, which provides for receiving the one or more user-defined designations as one or more designations of facts uniquely associated with the user to develop one or more questions for authenticating the user in an authentication session. In one embodiment, the system including data protection module 322 operates to use the designation of facts uniquely associated with the user to create authentication questions that are likely to be known to the user since the user controlled the choice of questions.

Block 420 further includes optional block 4204, which provides for receiving one or more designations of computationally networked sources of data concerning the user, the designations identifying one or more user-preferred sources of data for authentication by the voice-capable system. In an embodiment, rather than facts uniquely associated with the user, the user can designate sources of data where information likely to be known to the user is present.

Block 420 further includes optional block 4206. Depicted within optional block 4206 are optional blocks 42062 and 42064. Block 42062 provides for retrieving one or more logged data via the security interface, the one or more logged data including facts uniquely associated with the user and identified by the user. Block 42064 provides for storing the one or more logged data in a database. For example, the logged data can be retrieved via user interface 360 shown in FIG. 3 and passed to security interface module 328. The logged data can then be stored in memory 370.

Block 42062 depicts optional block 420622, which provides for retrieving the one or more logged data via an application programming interface including a data structure configured to hold the logged data, the application programming interface operable on an application running the security interface. For example, in an embodiment, user interface 360 or security interface module 328 could include an application programming interface (API). The API could be configured to include a data structure to hold the data identified by the user as requiring additional operations. In the embodiment, the API could be operable on an interface application or the like. For example, the user interface 360 could be configured to include an application allowing for input/output designations. An API storing logged data can be operable with such an application to hold logged data in a data structure.

Block 42062 further depicts optional block 420624 which provides for retrieving the logged data from a data store, the data store coupled to receive the logged data from a utility of the security interface, the utility including one or more of a drag and drop utility, a designation utility, and/or a VIVO-enabled application. For example, in an embodiment, the drag and drop utility can cause an application and/or an API to activate upon receiving the data selected by the user. For purposes of embodiments disclosed herein, a drag and drop utility includes any utility enabling a user to designate and/or select data and signify that further operations should be performed on the data. A drag and drop utility can include an activation of an application, API or other operation mode that connects the data to an outside source for further operations. A drag and drop utility can also include an application included with an interface by which a user views data selected or designated. For example, in one embodiment, a drag and drop utility can include an application that operates within a web browser. The method by which the drag and drop utility enables a user to designate data for further operations can include highlighting the data and clicking on an icon associated with the drag and drop utility, highlighting the data and using a voice command in a VIVO-enabled system, such as stating a key combination or the like. The drag and drop utility can also be fully VIVO enabled by using specialized words to indicate data for further operations. For example, the VIVO-enabled system can incorporate a mode by which the drag and drop utility is operable such that data can be designated efficiently.

Block 42064 depicts optional blocks 420642 and 420644 which provide that the storing the one or more logged data in a database can further include designating the logged data as facts uniquely associated by the user in block 420642. Block 420644 depicts that the storing the one or more logged data in a database can further include assigning a date to the logged data.

Block 42062 further depicts optional blocks 420646 and 420648 which provide that the retrieving one or more logged data via the security interface, the one or more logged data including facts uniquely associated with the user and identified by the user can include, in block 420646 receiving an indicator that the monitored network interaction has ended, and block 420648 provides for determining whether the security interface received the one or more logged data. Thus, for example, a security interface could have a monitored interaction wherein a user could choose to identify facts, but the user can also determine that no facts appropriate for further operations could be identified during the monitored interaction.

Block 420 further depicts optional block 4208 which provides for receiving one or more user-defined designations during the monitored network interaction, the one or more user-defined designations to enable the voice-capable system to mark the one or more user-defined designations as identifying data requiring that the one or more operations include confidential and/or proprietary marking. In an embodiment, an associated-correct answer could be collected to be used in future authentication sessions with the user to provide an additional layer of security.

Depicted within optional block 4208 is optional block 42082 which provides for receiving the one or more user-defined designations as one or more of a file, an email, a directory, and/or a selection of data.

Also depicted within optional block 4208 is optional block 42084 which provides for receiving the one or more user-defined designations via a utility, the utility including one or more of a drag and drop utility, a designation utility, and/or a VIVO-enabled application operating with the voice-capable system to mark the one or more user-defined designations and identify the data requiring that the one or more operations include confidential and/or proprietary marking.

Block 430 provides for performing the one or more operations with respect to the one or more data, the one or more operations including scanning one or more of data identified via the user-defined designations for confidential material, content checking, facts unique to the user for use in an authentication with the user for security purposes, and/or data identified via the user-defined designations for purposes of cross-correlating the one or more data with predetermined data. For example, the one or more operations could be performed by a bank or other secure institution that would perform scanning of the data. Thus, a user that designates data as requiring operations could be designating data as requiring scanning. For example, if a user receives an email from a source unknown to the user, the user could designate the data including the email as requiring scanning for viruses or other malicious content. Alternatively, the user could identify data as requiring operations to include any data designated for use in developing an authentication question and answer session.

Figure 5:
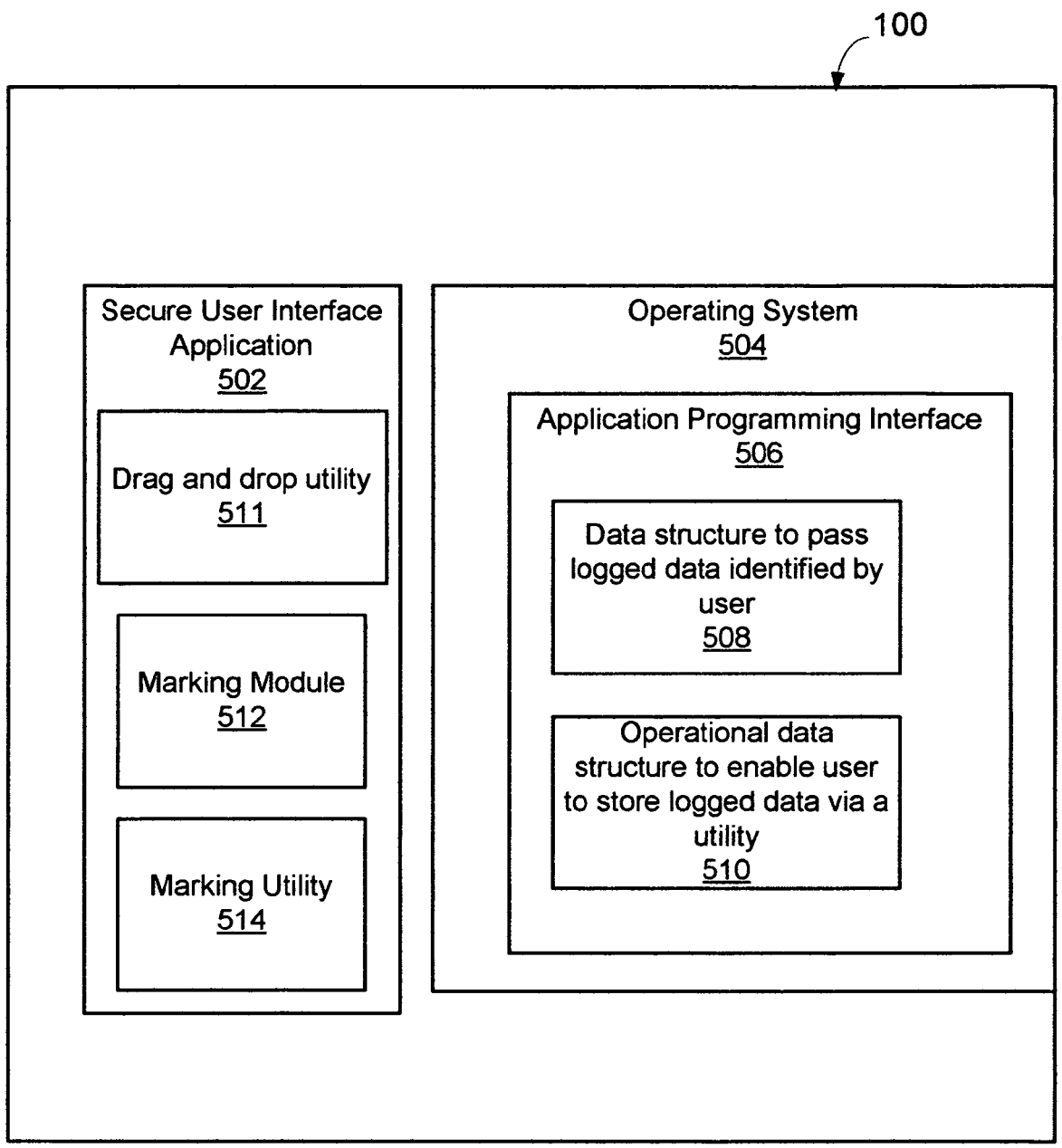
FIG. 5 is a block diagram of a computing system illustrated to show that in an embodiment computing system 100 can include a secure user interface application and an operating system.

Referring now to FIG. 5, computing system 100 is illustrated to show that in an embodiment computing system 100 can include a secure user interface application 502 and operating system 504 as an operating system executing on the computing system, including an application programming interface (API) to facilitate communication between the secure user interface application and a voice-capable system that is configured to implement embodiments.

According to an embodiment, the operating system 504 can include an application programming interface (API) 506 with at least two data structures. One data structure is depicted as data structure 508 and can be configured as a data structure to pass logged data identified by a user in a user initiated monitored network interaction. Another data structure is depicted as data structure 510 and can be configured as an operational data structure to enable a user to store the logged data identified by the user designating data via a utility associated with the secure user interface application. For example, the utility can include a drag and drop utility, a designation utility, and/or a VIVO-enabled application.

Data structure 508 can be configured as data structure to pass logged data identified by a user in a user initiated monitored network interaction that further includes one or more logged data identifying one or more network sources of facts relevant to authentication of the user. Data structure 508 can further include one or more logged data identified by the user as proprietary information.

The secure user interface application 502 can be configured as a secure user interface application running as a web page. Thus, for example, a user can operate the application through a web page and implement the designations of data by dragging and dropping data onto a "bucket" or the like that is on the web page application. In another embodiment, the secure user interface application 502 can be configured as a secure user interface application for an entity requiring security, the entity including one or more of a financial institution, a military institution, a government institution, a proprietary information repository, or a personal information repository. For example, a personal information repository could include employer database configured to hold data of an employee, the data of the employee for purposes of authentication.

FIG. 5 illustrates that the secure user interface application 502 can be configured to include a drag and drop utility 511, a marking module 512 and a marking utility 514. Drag and drop utility 511 can be configured as a utility configured as a drag and drop utility, a designation utility, and/or a VIVO-enabled application to receive the one or more logged data identified by the user, the utility configured to load the operational data structure with one or more of a file, an email, and/or a selection of data as the logged data identified by the user.

Marking module 512 can be configured as a marking module configured to mark the one or more logged data identified by the user as requiring additional operations. More particularly, in one embodiment marking module 512 includes a marking utility configured to designate the one or more logged data identified by the user as confidential with respect to firewall penetration.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

We claim:

1. A method for use with a voice-capable system, the voice-capable system including a security interface for authenticating a user to the voice-capable system, the method comprising:
receiving a request from a user computationally networked to the voice-capable system, the request to designate a network interaction as a monitored network interaction using the security interface;
receiving one or more user-defined designations during the monitored network interaction via at least one voice command of a voice-in/voice-out (VIVO) enabled application to highlight one or more data within a web browser, the one or more user-defined designations to designate the one or more data as requiring the voice-capable system to perform one or more operations with respect to the one or more data;
logging the monitored network interaction to produce one or more logged data; and
retrieving, via a visual user interface, the one or more data designated by the one or more user-defined designations from the one or more logged data.

2. The method of claim 1 wherein the receiving a request from a user computationally networked to the voice-capable system, the request to designate a network interaction as a monitored network interaction using the security interface includes:
receiving an identifier from the user, the identifier identifying the user and enabling the security interface to log the monitored network interaction.

3. The method of claim 1 wherein the receiving a request from a user computationally networked to the voice-capable system, the request to designate a network interaction as a monitored network interaction using the security interface includes:
receiving the one or more user-defined designations as one or more designations of facts uniquely associated with the user to develop one or more questions for authenticating the user in an authentication session.

4. The method of claim 1 wherein the receiving a request from a user computationally networked to the voice-capable system, the request to designate a network interaction as a monitored network interaction using the security interface includes:
receiving one or more designations of computationally networked sources of data concerning the user, the designations identifying one or more user-preferred sources of data for authentication by the voice-capable system.

5. The method of claim 1 wherein the receiving a request from a user computationally networked to the voice-capable system, the request to designate a network interaction as a monitored network interaction using the security interface includes:
retrieving the one or more logged data via the security interface, the one or more logged data including facts uniquely associated with the user and identified by the user; and
storing the one or more logged data in a database.

6. The method of claim 5 wherein the retrieving the one or more logged data via the security interface, the one or more logged data including facts uniquely associated with the user and identified by the user includes:
retrieving the one or more logged data via an application programming interface including a data structure configured to hold the logged data, the application programming interface operable on an application running the security interface.

7. The method of claim 5 wherein the storing the one or more logged data in a database includes:
designating the logged data as facts uniquely associated by the user; and
assigning a date to the logged data.

8. The method of claim 5 wherein the retrieving the one or more logged data via the security interface, the one or more logged data including facts uniquely associated with the user and identified by the user includes:
retrieving the logged data from a data store, the data store coupled to receive the logged data from a utility of the security interface, the utility including one or more of a drag and drop utility, a designation utility, and/or the VIVO-enabled application.

9. The method of claim 5 wherein the retrieving the one or more logged data via the security interface, the one or more logged data including facts uniquely associated with the user and identified by the user includes:
receiving an indicator that the monitored network interaction has ended; and
determining whether the security interface received the one or more logged data.

10. The method of claim 1 wherein the receiving one or more user-defined designations during the monitored network interaction, the one or more user-defined designations to designate one or more data as requiring the voice-capable system to perform one or more operations with respect to the one or more data includes:
receiving one or more user-defined designations during the monitored network interaction, the one or more user-defined designations to enable the voice-capable system to mark the one or more user-defined designations as identifying data requiring that the one or more operations include confidential and/or proprietary marking.

11. The method of claim 10 wherein the receiving one or more user-defined designations during the monitored network interaction, the one or more user-defined designations to enable the voice-capable system to mark the one or more user-defined designations as identifying data requiring that the one or more operations include confidential and/or proprietary marking includes:
receiving one or more additional user-defined designations as one or more of a file, an email, and/or a directory.

12. The method of claim 1, further comprising:
performing the one or more operations with respect to the one or more data, the one or more operations including scanning one or more of data identified via the user-defined designations for confidential material, content checking, facts unique to the user for use in an authentication with the user for security purposes, and/or data identified via the user-defined designations for purposes of cross-correlating the one or more data with predetermined data.

13. A computing system comprising:
a secure user interface application; and
an operating system executing on the computing system, including an application programming interface (API) to facilitate communication between the secure user interface application and a voice-capable system wherein the API includes:
a data structure secured by a user to pass logged data identified by the user in a user initiated monitored network interaction; and
an operational data structure secured by the user to enable the user to locally store the logged data identified by the user designating one or more data via at least one voice command of a voice-in/voice-out (VIVO) enabled application associated with the secure user interface application.

14. The computing system of claim 13 wherein the data structure to pass logged data identified by a user in a user initiated monitored network interaction includes:
one or more logged data identifying one or more network sources of facts relevant to authentication of the user.

15. The computing system of claim 13 wherein the data structure to pass logged data identified by a user in a user initiated monitored network interaction includes:
one or more logged data identified by the user as proprietary information.

16. The computing system of claim 13 wherein the secure user interface application includes:
a secure user interface application running as a web page.

17. The computing system of claim 13 wherein the secure user interface application includes:
a secure user interface application for an entity requiring security, the entity including one or more of a financial institution, a military institution, a government institution, a proprietary information repository, or a personal information repository.

18. The computing system of claim 17 wherein the secure user interface application for an entity requiring security, the entity including one or more of a financial institution, a military institution, a government institution, a proprietary information repository, or a personal information repository includes:
an employer database configured to hold data of an employee, the data of the employee for purposes of authentication.

19. The computing system of claim 13 wherein the secure user interface application includes:
the VIVO-enabled application configured to load the operational data structure with one or more of a file, an email, and/or a selection of data as the logged data identified by the user.

20. The computing system of claim 13 wherein the secure user interface application includes:
a scanning module configured to scan the one or more of the file, the email, and/or the selection of data, the scan according to one or more scanning rules.

21. The computing system of claim 13 wherein the secure user interface application includes:
a marking module configured to mark the one or more logged data identified by the user as requiring additional operations.

22. The computing system of claim 21 wherein the marking module configured to mark the one or more logged data identified by the user as requiring additional operations includes:
a marking utility configured to designate the one or more logged data identified by the user as confidential with respect to firewall penetration.

23. A computer program product comprising:
a non-transitory recordable signal bearing medium bearing;
one or more instructions for receiving a request from a user computationally networked to the voice-capable system, the request to designate a network interaction as a monitored network interaction using the security interface;
one or more instructions for receiving one or more user-defined designations during the monitored network interaction via at least one voice command of a voice-in/voice-out (VIVO) enabled application to highlight one or more data within a web browser, the one or more user-defined designations to designate the one or more data as requiring the voice-capable system to perform one or more operations with respect to the one or more data;
one or more instructions for logging the monitored network interaction to produce one or more logged data; and
one or more instructions for retrieving, via a visual user interface, the one or more data designated by the one or more user-defined designations from the one or more logged data.

24. The computer program product of claim 23 wherein the one or more instructions for receiving a request from a user computationally networked to the voice-capable system, the request to designate a network interaction as a monitored network interaction using the security interface includes:
one or more instructions for receiving an identifier from the user, the identifier identifying the user and enabling the security interface to log the monitored network interaction.

25. The computer program product of claim 23 wherein the one or more instructions for receiving one or more user-defined designations during the monitored network interaction, the one or more user-defined designations to designate one or more data as requiring the voice-capable system to perform one or more operations with respect to the one or more data includes:
one or more instructions for receiving the one or more user-defined designations as one or more designations of facts uniquely associated with the user to develop one or more questions for authenticating the user in an authentication session.

26. The computer program product of claim 23 wherein the one or more instructions for receiving one or more user-defined designations during the monitored network interaction, the one or more user-defined designations to designate one or more data as requiring the voice-capable system to perform one or more operations with respect to the one or more data includes:

one or more instructions for receiving one or more designations of computationally networked sources of data concerning the user, the designations identifying one or more user-preferred sources of data for authentication by the voice-capable system.

27. The computer program product of claim 23 wherein the receiving one or more user-defined designations during the monitored network interaction, the one or more user-defined designations to designate one or more data as requiring the voice-capable system to perform one or more operations with respect to the one or more data includes:

one or more instructions for retrieving the one or more logged data via the security interface, the one or more logged data including facts uniquely associated with the user and identified by the user and one or more instructions for storing the one or more logged data in a database.

28. The computer program product of claim 27 wherein the one or more instructions for retrieving the one or more logged data via the security interface, the one or more logged data including facts uniquely associated with the user and identified by the user includes:

one or more instructions for retrieving the one or more logged data via an application programming interface including a data structure configured to hold the logged data, the application programming interface operable on an application running the security interface.

29. The computer program product of claim 27 wherein the one or more instructions for the storing the one or more logged data in a database includes:

one or more instructions for designating the logged data as facts uniquely associated by the user; and one or more instructions for assigning a data to the logged data.

30. The computer program product of claim 27 wherein the one or more instructions for the retrieving the one or more logged data via the security interface, the one or more logged data including facts uniquely associated with the user and identified by the user includes:

one or more instructions for retrieving the logged data from a data store, the data store coupled to receive the logged data from a utility of the security interface, the utility including one or more of a drag and drop utility, a designation utility, and/or the VIVO-enabled application.

31. The computer program product of claim 27 wherein the one or more instructions for retrieving the one or more logged data via the security interface, the one or more logged data including facts uniquely associated with the user and identified by the user includes:

one or more instructions for receiving an indicators that the monitored network interaction has ended; and one or more instructions for determining whether the security interface received the one or more logged data.

32. The computer program product of claim 23 wherein the one or more instructions for receiving one or more user-defined designations during the monitored network interaction, the one or more user-defined designations to designate one or more data as requiring the voice-capable system to perform one or more operations with respect to the one or more data includes:

one or more instructions for receiving one or more user-defined designations during the monitored network interaction, the one or more user-defined designations to enable the voice-capable system to mark the one or more user-defined designations as identifying data requiring that the one or more operations include confidential and/or proprietary marking.

33. The computer program product of claim 32 wherein the one or more instructions for receiving one or more user-defined designations during the monitored network interaction, the one or more user-defined designations to enable the voice-capable system to mark the one or more user-defined designations as identifying data requiring that the one or more operations include confidential and/or proprietary marking:

one or more instructions for receiving one or more additional user-defined designations as one or more of a file, an email, a directory, and/or a selection of data.

34. The computer program product of claim 23 further comprising:

one or more instructions for performing the one or more operations with respect to the one or more data, the one or more operations including scanning one or more of data identified via the user-defined designations for confidential material, content checking, facts unique to the user for use in an authentication with the user for security purposes, and/or data identified via the user-defined designations for purposes of cross-correlating the one or more data with predetermined data.

35. A voice-capable system comprising:

a processor;

audio input and/or output circuitry coupled to the processor;

a memory coupled to the processor;

an access module for receiving a request from a user computationally networked to the voice-capable system, the request to designate a network interaction as a monitored network interaction using the security interface coupled to the memory;

a network interaction monitoring module for receiving one or more user-defined designations during the monitored network interaction via at least one voice command of a voice-in/voice-out (VIVO) enabled application to highlight one or more data within a web browser, the one or more user-defined designations to designate the one or more data as requiring the voice-capable system to perform one or more operations with respect to the one or more data coupled to the memory;

a security interface module for logging the monitored network interaction to produce one or more logged data; and a visual user interface for retrieving the one or more data designated by the one or more user-defined designations from the one or more logged data.

36. The voice-capable system of claim 35 wherein one or more of the access module, the security interface module, the visual user interface, and the network interaction monitoring module is coupled to the processor, located within the processor, and/or located in the memory.

37. The voice-capable system of claim 35 wherein the memory is one or more of a random access memory, a read only memory, an optical memory, or a subscriber identity module memory.

38. The voice-capable system of claim 35 wherein the audio input and/or output circuitry includes one or more of a microphone, a speaker, a transducer, and/or audio input and/or output circuitry.

39. The voice-capable system of claim 35 further comprising:

a housing coupled to the processor, the housing encasing the memory, the processor, and/or the audio input and/or output circuitry.

* * * * *

UNITED STATES PATENT AND TRADEMARK OFFICE
CERTIFICATE OF CORRECTION

| | | |
|---|---|---|
| PATENT NO. | : 7,937,745 B2 | Page 1 of 1 |
| APPLICATION NO. | : 11/263575 | |
| DATED | : May 3, 2011 | |
| INVENTOR(S) | : Edward K. Y. Jung et al. | |

It is certified that error appears in the above-identified patent and that said Letters Patent is hereby corrected as shown below:

Column 17, line 60, claim 31: "for receiving an indicators that the" should read
--for receiving an indicator that the--

Signed and Sealed this
Ninth Day of April, 2013

Teresa Stanek Rea
*Acting Director of the United States Patent and Trademark Office*